(12) United States Patent
Zhu et al.

(10) Patent No.: US 10,784,776 B2
(45) Date of Patent: Sep. 22, 2020

(54) SELF-BOOST ISOLATION DEVICE

(71) Applicant: Texas Instruments Incorporated, Dallas, TX (US)

(72) Inventors: Danyang Zhu, Cary, NC (US); Zhidong Liu, Cary, NC (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/126,666

(22) Filed: Sep. 10, 2018

(65) Prior Publication Data
US 2020/0083804 A1 Mar. 12, 2020

(51) Int. Cl.
| H04B 1/18 | (2006.01) |
| H04B 1/38 | (2015.01) |
| H04B 3/28 | (2006.01) |
| H02M 3/07 | (2006.01) |

(52) U.S. Cl.
CPC .................... *H02M 3/07* (2013.01)

(58) Field of Classification Search
CPC ........................................ H02M 3/07
See application file for complete search history.

(56) References Cited

U.S. PATENT DOCUMENTS

| 5,428,626 | A | * | 6/1995 | Frisch | G01R 31/318513 324/73.1 |
| 5,786,711 | A | * | 7/1998 | Choi | H03K 19/0016 326/17 |
| 5,973,514 | A | * | 10/1999 | Kuo | H03K 19/0963 326/121 |
| 6,060,948 | A | * | 5/2000 | Tarantola | H03K 17/063 327/390 |
| 6,842,063 | B2 | * | 1/2005 | Tachibana | H03K 17/063 327/404 |
| 6,853,229 | B2 | * | 2/2005 | Viehmann | H03K 5/151 327/199 |
| 7,053,945 | B1 | * | 5/2006 | Xue | H03K 19/01707 348/294 |
| 7,705,647 | B2 | * | 4/2010 | Dai | H03K 5/1565 327/170 |
| 8,994,439 | B2 | * | 3/2015 | Kaneyasu | H03K 3/012 327/390 |
| 9,520,906 | B2 | * | 12/2016 | Butterfield | H03F 1/0205 |
| 9,548,655 | B2 | * | 1/2017 | Ersoy | H02M 3/073 |

(Continued)

*Primary Examiner* — Kenneth B Wells
(74) *Attorney, Agent, or Firm* — Mark Allen Valetti; Charles A. Brill; Frank D. Cimino (57) ABSTRACT

An isolation device provides high common mode transient immunity without increasing the supply voltage rails in the transmitter side. In one aspect, the disclosed isolation device implements a self-boosting scheme to increase a voltage swing of a transmission signal under a lesser supply voltage rail. The disclosed isolation device includes a first stage circuit, a boost circuit, and a second stage circuit. The first stage circuit is configured to generate first and second signals each having a first voltage within a supply voltage range. The boost circuit is configured to provide a boosted voltage range greater than the supply voltage range responsive to at least one of the first or second signal. The second stage circuit is configured to generate an output signal based on either one of the first or second signal, such that the output signal has a second voltage within the boosted voltage range.

15 Claims, 6 Drawing Sheets

(56) References Cited

U.S. PATENT DOCUMENTS

| | | | |
|---|---|---|---|
| 10,110,223 B2* | 10/2018 | Lee ........................ | H03K 5/135 |
| 2013/0162305 A1* | 6/2013 | Watanabe .............. | H03K 17/00 |
| | | | 327/109 |

* cited by examiner

SELF-BOOST ISOLATION DEVICE

BACKGROUND

Isolation devices are used in electrical systems in which two or more electrical circuits are configured to exchange signal or power without passing any current therebetween. Isolation devices may provide several benefits to such electrical systems. In the application of power exchange, for example, an isolation device may provide safety by shielding equipment and humans from high voltage sources. Also, an isolation device may reduce or even eliminate ground (or common mode) noise by breaking the ground loop between a transmission circuit and a reception circuit. And with the proper isolation device, a communication system may send and receive long distance signals without using any reference circuit.

SUMMARY

The present disclosure describes systems and techniques relating to configuring and operating one or more isolation devices that provide high common mode transient immunity (CMTI) between a transmitter circuit and a receiver circuit. As described herein, the CMTI of an isolation device can be understood as the ability thereof to reject fast common-mode transients, which are typically measured in kV/µs. The disclosed isolation device provides high CMTI without increasing the voltage level of the supply rails in the transmitter side. In one aspect, the disclosed isolation device implements a self-boosting scheme to increase a transmission voltage range of a transmission signal while using a lesser supply rail voltage. Advantageously, the disclosed isolation devices can be adopted over a wide range of transmitter voltage conditions. For example, the disclosed isolation device can be adopted to replace an optocoupler, the transmitter side of which operates under a supply voltage that is less than 1.8V.

In one implementation, for example, the present disclosure introduces a capacitive isolation device with a transmitter circuit that includes a voltage supply terminal, a first stage circuit, a boost circuit, and a second stage circuit. The first stage circuit has a first supply input that is coupled to the voltage supply terminal, a first input terminal, and a first output terminal. The boost circuit has a second supply input that is selectively coupled to the voltage supply terminal, a second input terminal that is coupled to the first output terminal, and a second output terminal. The second stage circuit has a third supply input that is coupled to the second output terminal, a third input terminal that is coupled to the first output terminal, and a third output terminal.

In another implementation, for example, the present disclosure introduces a capacitive isolation device with a transmitter circuit that includes a voltage supply terminal, a first stage circuit, a boost circuit, and a second stage circuit. The first stage circuit is configured to: receive an input signal, generate a first signal based on the input signal, and generate a second signal complementary of the first signal. The first and second signals each has a first voltage within a supply voltage range. The boost circuit is coupled to the first stage circuit, and it is configured to provide a boosted voltage range greater than the supply voltage range responsive to at least one of the first or second signal. The second stage circuit is configured to generate an output signal based on either one of the first or second signal, such that the output signal has a second voltage within the boosted voltage range.

In yet another implementation, for example, the present disclosure introduces a capacitive isolation device with a receiver circuit, a transmitter circuit, and a capacitor that is coupled between the receiver circuit and the transmitter circuit. The transmitter circuit includes first and second voltage supply lines, first and second charge pumps, and a non-inverted output stage circuit. The first charge pump has a first supply input that is coupled to the first voltage supply line, a first signal input that is coupled to receive a non-inverted input signal, and a first output. The second charge pump has a second supply input that is coupled to the second voltage supply line, a second signal input that is coupled to receive the non-inverted input signal, and a second output. The non-inverted output stage circuit has an upper supply input that is coupled to the first output of the first charge pump, and a lower supply input that is coupled to the second output of the second charge pump.

Like reference symbols in the various drawings indicate like elements. Details of one or more implementations of the present disclosure are set forth in the accompanying drawings and the description below. The figures are not drawn to scale and they are provided merely to illustrate the disclosure. Specific details, relationships, and methods are set forth to provide an understanding of the disclosure. Other features and advantages may be apparent from the description and drawings, and from the claims.

DETAILED DESCRIPTION

Figure 1:
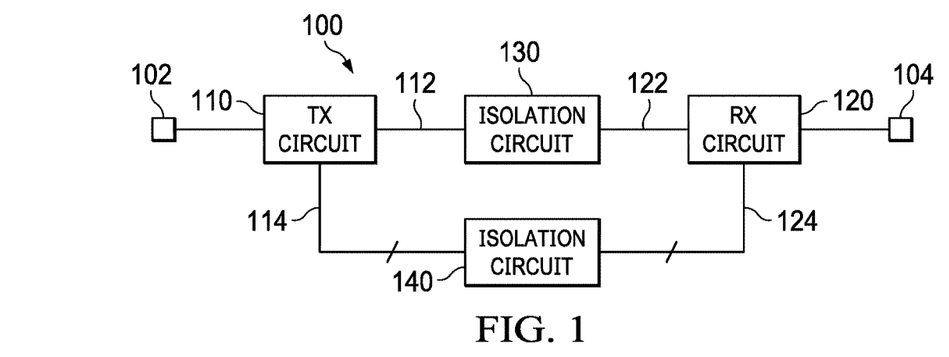
FIG. 1 shows a schematic diagram of a power conversion system according to an aspect of the present disclosure.

FIG. 1 shows a schematic diagram of a power conversion system 100 according to an aspect of the present disclosure. The power conversion system 100 includes a voltage input terminal 102 and a voltage output terminal 104. Between these I/O terminals, the power conversion system 100 includes a transmission circuit 110, a reception circuit 120, and one or more isolation circuits 130 and 140 for providing galvanic isolations between the transmission and reception circuits 110 and 120. The transmission circuit 110 is configured to receive an input voltage from the voltage input terminal 102, whereas the reception circuit 120 is configured to deliver an output voltage at the voltage output terminal 104. Where the output voltage is set to be less than the input voltage, the power conversion system 100 operates as a buck converter. And where the output voltage is set to be greater than the input voltage, the power conversion system 100 operates as a boost converter. Moreover, the power conversion system 100 may be configured to perform AC to DC conversion, DC to AC conversion, and/or DC to DC conversion.

The first isolation circuit 130 may include a transformer topology, in which power is transferred from the transmission circuit 110 to the reception circuit 120. The transmission circuit 110 may generate a power transmission signal 112 to be received as a power reception signal 122 by the reception circuit 120. In this power transfer scheme, the first isolation circuit 130 isolates the transmission circuit 110 from the reception circuit 120 by preventing current from flowing between these two circuits. The isolation provided by the first isolation circuit 130 protects the low voltage circuit from the high voltage circuit, thereby minimizing a risk of equipment damage or human injury.

The second isolation circuit 140 may include a capacitor topology, in which signals are transferred between the transmission circuit 110 and the reception circuit 120. The signal transfer can be unidirectional or bi-directional. In a feedback communication, for example, the reception circuit 120 may generate one or more reception feedback data signals 124 to be received by the transmission circuit 110 as one or more transmission feedback data signals 114. While enabling the feedback communication, the second isolation circuit 140 isolates the reception circuit 120 from the transmission circuit 110 by preventing current from flowing between these two circuits. In a feed-forward communication, for example, the transmission circuit 110 may generate one or more transmission feed-forward data signals 114 to be received by the reception circuit 120 as one or more reception feed-forward data signals 124. While enabling the feed-forward communication, the second isolation circuit 140 isolates the reception circuit 120 from the transmission circuit 110 by preventing current from flowing between these two circuits. In either communication direction, the second isolation circuit 140 protects the low voltage circuit from the high voltage circuit, thereby minimizing a risk of equipment damage or human injury.

The performance of the second isolation circuit 140 can be defined in part by its signal-to-noise ratio (SNR) and its common-mode transient immunity (CMTI). In practice, the transmitter side (which can be coupled to either the transmission circuit 110 or the reception circuit 120 depending on the communication direction) of an isolation device (e.g., second isolation device 140), generates a pair of differential signals to be sent across the isolation barrier. The differential signals are then received by the receiver side (which can be coupled to either the transmission circuit 110 or the reception circuit 120 depending on the communication direction) of the isolation device. The signal amplitude of the transmitter signal may affect the SNR and/or the CMTI of the isolation device.

Figure 7A:
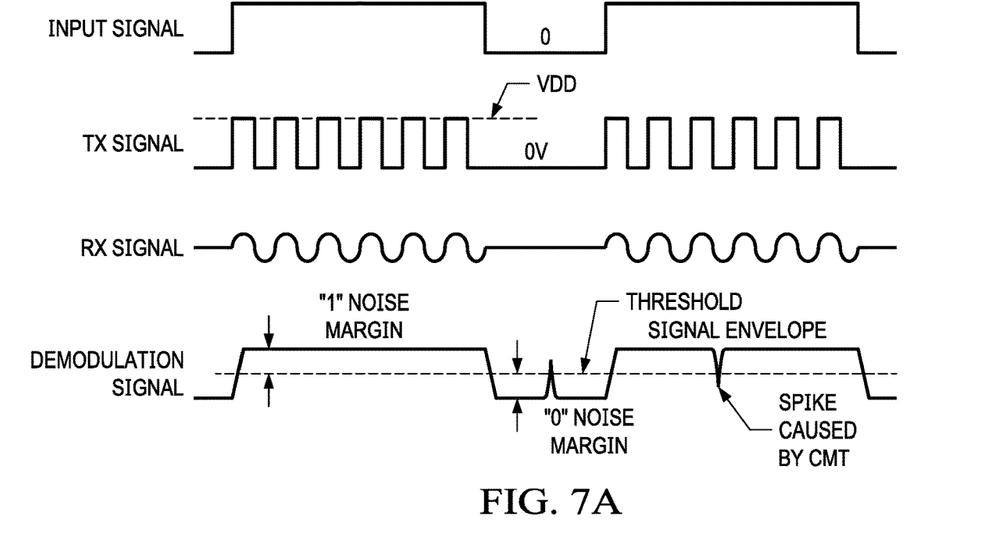
FIGS. 7A and 7B shows signal waveforms comparing the common mode transient immunity (CMTI) between an isolation device without self-boosting and an isolation device with self-boosting according to an aspect of the present disclosure.

As shown in FIG. 7A, for example, the transmitter (TX) signal may be an on-off keying signal modulated from an input signal. The TX signal may have a signal amplitude between VDD and 0V from the transmitter side, whereas the receiver (RX) signal may be an attenuated or degraded version of the TX signal. The receiver side of the isolation device demodulates the RX signal to recover the data of the input signal. The demodulation scheme may be based upon a threshold value within a receptor voltage supply range that is different from the transmitter voltage supply range (e.g., VDD to 0V). Common-mode transients (CMT) may inject noise spikes to the signal envelop of the demodulation signal, thereby corrupting the data value recovered from the RX signal.

Figure 7B:
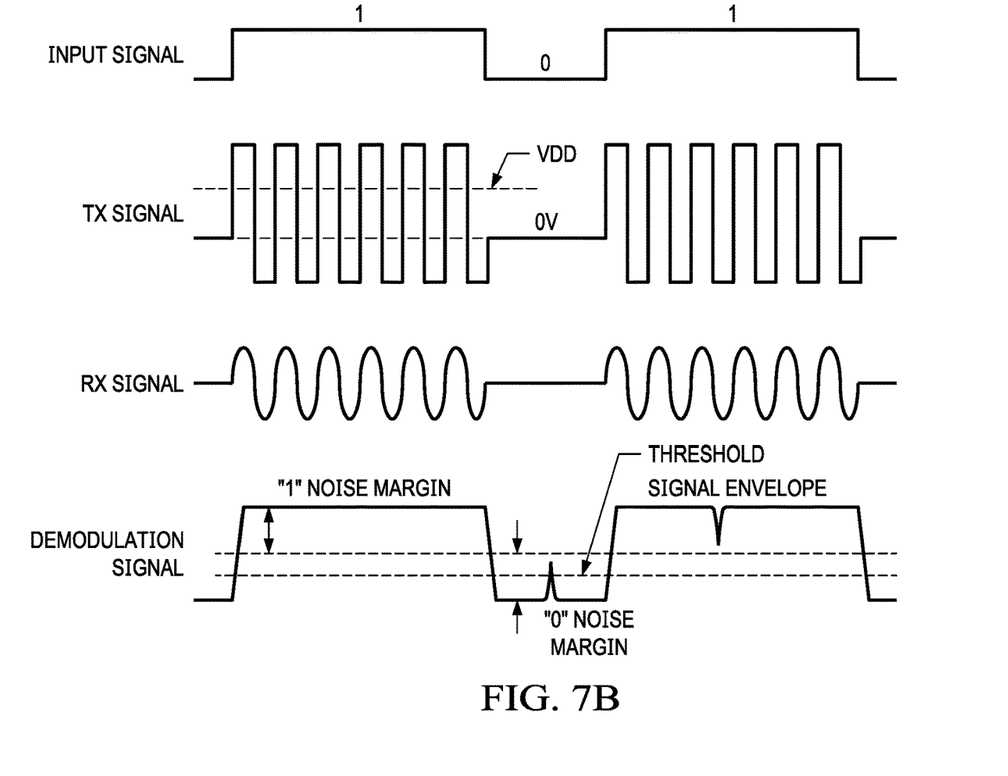

Data corruption caused by CMT is unlikely to be remedied at the receiver end, as any attempt to boost the RX signal will likely amplify the transient noise as well. That being said, data corruption can be mitigated or preempted by boosting the TX signal. In general, as shown in FIG. 7B, a TX signal with a higher voltage amplitude tends to have a larger noise margin, which reduces the likelihood of data corruption caused by CMT spikes. One approach to boost the TX signal is by increasing the supply voltage of the transmitter circuit in an isolation device. This approach however, may have limited applicability to low voltage transmitters that support high frequency operations. In particular, where a capacitive isolation device is adapted as an emulator of another type of isolation device that operates at high frequency (e.g., greater than 100 MHz), the voltage supply range may be set at a relatively low value, such as 1.8V or less. To emulate an optocoupler (e.g., opto-emulator), for example, a capacitive isolation device is configured to receive a supply voltage from two supply pins that are designed for a transmitter diode, which only takes about 1V to operate. With this small range of supply voltage, it may be challenging to boost the TX signal amplitude for improving the isolation device's overall CMTI performance.

Figure 2:
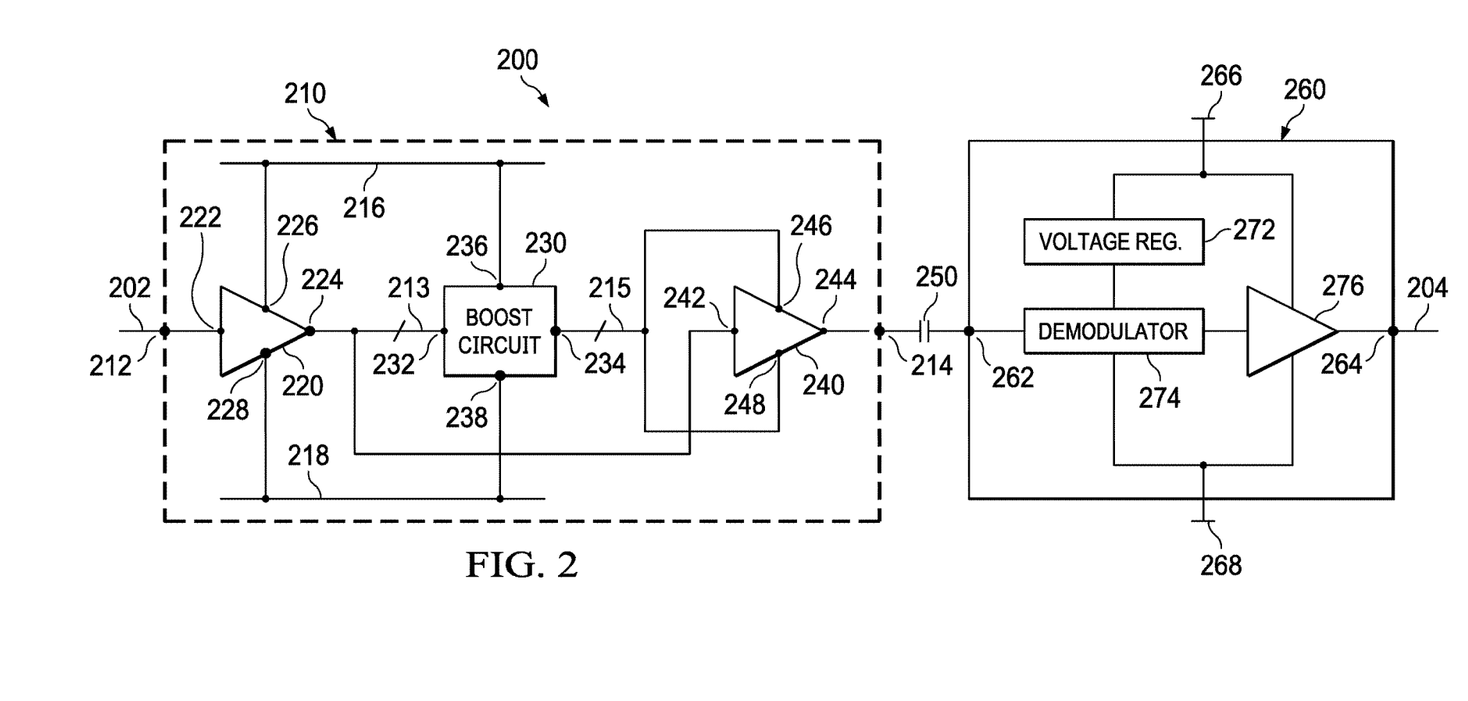
FIG. 2 shows a schematic diagram of a capacitive isolation device according to an aspect of the present disclosure.

To address the aforementioned challenges, the present disclosure introduces a self-boost transmitter architecture to provide high CMTI performance for capacitive isolation devices that are under low voltage supply conditions and configured to support high frequency operations. Referring to FIG. 2, a schematic diagram of a capacitive isolation device (CID) 200 is shown according to an implementation of the disclosed subject matters. The CID device 200 may be a part of the power conversion system 100, and it may be configured to implement the functional features of the second isolation device 140 as described in FIG. 1.

The CID 200 includes a transmitter circuit 210, an isolation capacitor 250, and a receiver circuit 260. The CID 200 may be implemented on a single integrated circuit die. Alternatively, the CID 200 may be implemented as a single package device enclosing multiple integrated circuit dies, each of which may include one of the transmitter circuit 210, the isolation capacitor 250, or the receiver circuit 260. In this implementation, the isolation capacitor 250 may be integrated into a single chip by itself, with the transmitter circuit 210, and/or with the receiver circuit 260. The transmitter circuit 210 includes an input terminal 212 that is configured to receive an input signal, and an output terminal 214 that is configured to deliver a transmission (TX) signal. The input signal can be a signal modulated with on-off keying, and the TX signal is an amplified version of the input signal. The isolation capacitor 250 is coupled between the transmitter circuit 210 and the receiver circuit 260. In particular, the capacitor 250 has a first conductive plate that is coupled to the output terminal 214 of the transmitter circuit 210, and a second conductive plate that is coupled to an input terminal 262 of the receiver circuit 260.

The transmitter circuit 210 includes a first voltage supply terminal 216 and a second voltage supply terminal 218 to provide a supply voltage for operating or enabling the transmitter circuit 210. In one implementation, the first voltage supply terminal 216 may be configured to receive a regulated voltage of VDD, and the second voltage supply terminal 218 may be configured to receive a ground voltage of 0V. Depending on the deployment of the CID 200, the value of VDD may vary. In one example, VDD may have a value of 1.8V where the CID 200 is deployed as a digital-input isolator. In another example VDD may have a value of 1V where the CID 200 is deployed as an opto-emulator.

The transmitter circuit 210 also includes a first stage circuit 220, a boost circuit 230, and a second stage circuit 240. The first stage circuit 220 includes an input terminal 222, an output terminal 224, an upper supply input 226, and a lower supply input 228. The input terminal 222 is coupled to the input terminal 212 to receive the input signal. The first stage circuit 220 is configured to generate first stage output signals 213 based on the input signal received at the input terminal 222. In one implementation, for example, the first stage output signals may include a first signal amplifying a non-inverted version of the input signal. In another implementation, for example, the first stage output signals may include a second signal amplifying an inverted version of the input signal, which is complementary of the first signal. In yet another implementation, for example, the first stage output signals may include both the first and second signals.

The output terminal 224 is configured to deliver the first stage output signals 213. The upper supply input 226 is coupled to the first supply terminal 216, whereas the lower supply input 228 is coupled to the second supply terminal 218. Together, the upper and lower supply inputs 226 and 228 are configured to receive an operating supply voltage that defines a voltage range (or a rail-to-rail range) of the first stage output signals 213. For instance, the first stage output signals 213 may each have a voltage that is within the supply voltage range between VDD and 0V.

The boost circuit 230 includes an input terminal 232, an output terminal 234, an upper supply input 236, and a lower supply input 238. The input terminal 232 is coupled to the output terminal 224 to receive one or more first stage output signals 213. The upper supply input 236 is selectively coupled to the first voltage supply terminal 216 by one or more switches (see, e.g., 336A in FIGS. 3 and 536A, 538A in FIG. 5) internal to the boost circuit 230. Likewise, the lower supply input 238 is selectively coupled to the second voltage supply terminal 218 by one or more switches (see, e.g., 336B in FIGS. 3 and 536B, 538B in FIG. 5) internal to the boost circuit 230. The boost circuit 230 is configured to generate one or more boosted supply signals 215 responsive to at least one of the first stage output signals 213.

The boosted supply signals 215 provide a boosted voltage range that extends beyond the operating supply voltage range of the first and second supply terminals 216 and 218. In one implementation, for example, the boosted voltage range can be two times the operating supply voltage range. In another implementation, for example, the boosted voltage range can be three times the operating supply voltage range. The output terminal 234 is configured to output the boosted supply signals 215 for powering and enabling the operations of the second stage circuit 240.

The second stage circuit 240 serves as an output stage of the transmitter circuit 210. The second stage circuit 240 is configured to generate the TX signal to be transmitted across the isolation capacitor 250. The second stage circuit 240 includes an input terminal 242, an output terminal 244, an upper supply input 246, and a lower supply input 248. The input terminal 242 is coupled to the output terminal 224 to receive at least one of the first stage output signals 213. The upper supply input 246 is coupled to the output terminal 234 to receive a first one of the boosted supply signals 215, whereas the lower supply input 248 is coupled to the output terminal 234 to receive a second one of the boosted supply signals 215. In general, the upper supply input 246 is configured to receive a higher voltage than the lower supply input 248. The second stage circuit 240 is configured to generate the TX signal that amplifies at least one of the first stage output signals 213 within the boosted voltage range as provided by the boost voltage signals 215. The output terminal 244 is coupled to the output terminal 214, which is configured to transmit the TX signal.

When compared to the first stage circuit 220, the second stage circuit 240 operates at a boosted supply voltage range that is higher than the operating voltage range as provided by the first and second supply terminals 216 and 218. As such, the TX signal, which is generated by the second stage circuit 240, has a larger amplitude than the first stage output signal 213. Advantageously, the TX signal has a boost voltage that is enabled by the boosted voltage rail-to-rail range. In one implementation, for example, the TX signal has a boosted amplitude that is at least twice the input signal as received by the input terminal 202. In another implementation, for example, the TX signal has a boosted amplitude that is at least three times the input signal as received by the input terminal 202.

With the aforementioned advantages, the transmitter circuit 210, and the self-boosting scheme implemented thereby, can be used for boosting a transmission signal that operates at high frequency (e.g., 100 MHz or greater) without requiring a higher supply voltage. The self-boosting scheme can be implemented without including large-size components that are typically used in rail voltage pump circuit. Moreover, the transmitter circuit 210 can boost an input signal amplitude to a level that is much higher than the device rating of the CID 200. For example, where the CID 200 has a 1.8V device rating, the transmitter circuit 210 can provide a TX signal with at least a 3.6V rail-to-rail swing. The boosted supply rails provided by the boosted supply signals 215 can be dynamically adjusted based upon the particular state of the first stage output signals 213. With the dynamic rail boosting, the TX signal has a higher noise margin and a better CMTI performance than any conventional transmitter circuits for use in isolation devices. Moreover, the transmitter circuit 210 is versatile enough to fit within different types of isolation devices and operate under a wide range of supply voltage conditions and modulation frequencies. For instance, the transmitter circuit 210 can be adopted by an opto-emulator isolation driver or a digital input isolation driver.

Being coupled to the isolation capacitor 250, the receiver circuit 260 is configured to receive and demodulate the TX signal. The receiver circuit 260 has an input terminal 262, an output terminal 264, a first supply terminal 266, and a second supply terminal 268. Internally, the receiver circuit 260 includes a voltage regulator 272, a demodulator 274, and an output stage amplifier 276. The input terminal 262 is coupled to the isolation capacitor 250 to receive a reception (RX) signal originated from the transmitter circuit 210. The voltage regulator 272 is configured to regulate and provide a supply voltage to the demodulator 274. In one implementation, the voltage regulator 272 can be a low dropout (LDO) linear regulator. When powered, the demodulator 274 is configured to demodulate the RX signal and recover the data of the input signal. The output stage amplifier 276 is configured to amplify the demodulated signal and deliver the amplified signal to the output terminal 264, which is coupled to the output terminal 204 of the CID 200.

As the TX signal is transmitted across the isolation capacitor 250 by way of capacitive coupling, the RX signal may be subject to a certain degree of distortion, degradation, and/or attenuation. Moreover, because the receiver circuit 260 may be powered by a set of supply voltage rails that are different from those of the transmitter circuit 210, the RX signal may be injected with noises pertaining to the fluctuations between the two sets of supply voltage rails. The self-boosting scheme of the transmitter circuit 210 helps increase the noise margin and the CMTI of the TX signal, thereby preemptively minimizing the impacts of these transmission related issues.

Figure 3:
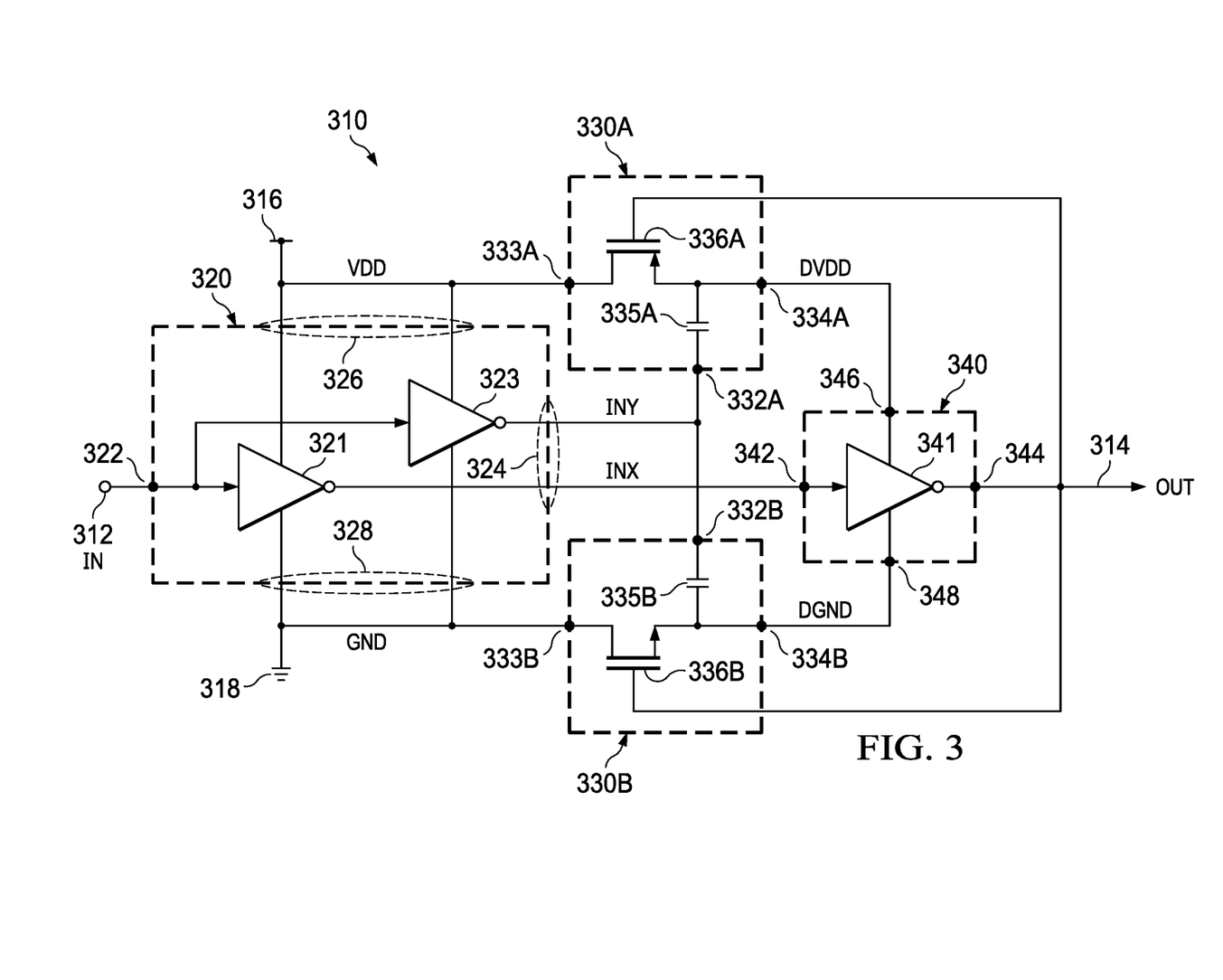
FIG. 3 shows a schematic diagram of a transmitter circuit for use in an isolation device according to an aspect of the present disclosure.
Figure 5:
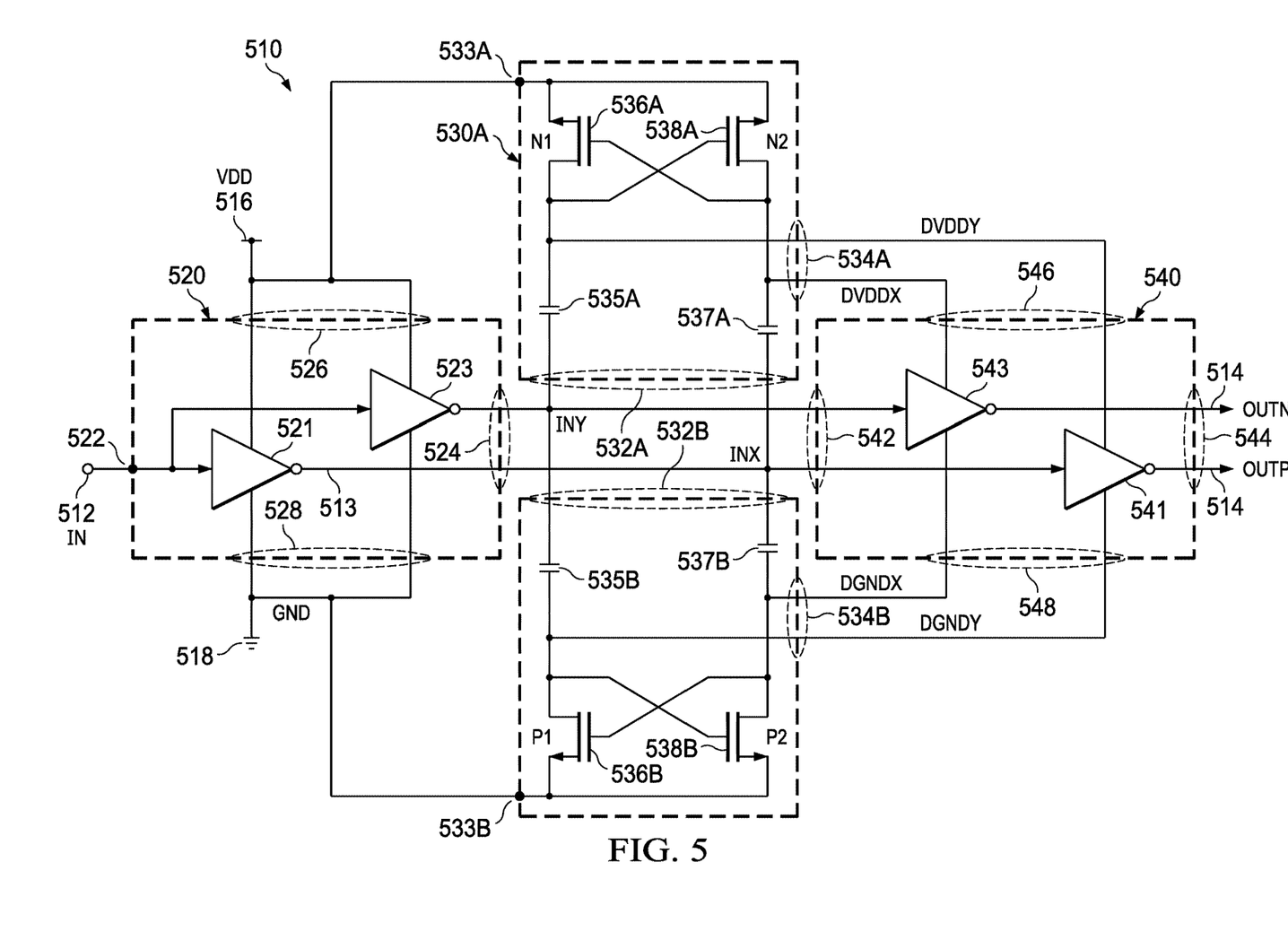
FIG. 5 shows a schematic diagram of a bipolar transmitter circuit for use in an isolation device according to an aspect of the present disclosure.

Consistent with the above description of FIG. 2, the present disclosure further introduces two example circuit implementations of the transmitter circuit 210, which are illustrated in FIGS. 3 and 5 respectively. While these specific circuit implementations serve as examples of the structural features that the transmitter circuit 210 may adopt, they do not preclude other circuit implementations that can perform the functional features as described above.

Referring to FIG. 3, the present disclosure introduces a transmitter circuit 310 that provides a single-end-signal implementation of the transmitter circuit 210. Like the transmitter circuit 210, the transmitter circuit 310 can be adopted by an isolation device, such as the CID 200. The transmitter circuit 310 may be implemented on a single integrated circuit die, alone or with other circuit components of an isolation device, such as the CID 200. The transmitter circuit 310 includes an input terminal 312 that is configured to receive an input signal, and an output terminal 314 that is configured to deliver a transmission (TX) signal. The input signal can be a modulated signal with on-off keying, and the TX signal is an amplified version of the input signal. The transmitter circuit 310 includes a first voltage supply terminal (or an upper voltage supply rail) 316 and a second voltage supply terminal (or a lower voltage supply rail) 318 to provide an operating supply voltage for the transmitter circuit 310. In one implementation, the first voltage supply terminal 316 may be configured to receive a regulated voltage of VDD, which is greater than a ground voltage, and the second voltage supply terminal 318 may be configured to receive the ground voltage, which may be 0V. The value of VDD may vary depending on the deployment of the transmitter circuit 310. In one example, VDD may have a value of 1.8V where the transmitter circuit 310 is adopted by a digital-input isolator. In another example VDD may have a value of 1V where the transmitter circuit 310 is adopted by an opto-emulator.

Like the transmitter circuit 210, the transmitter circuit 310 also includes a first stage circuit 320, a boost circuit 330 (which may be subdivided into 330A and 330B), and a second stage circuit 340. The first stage circuit 320 includes an input terminal 322, an output terminal 324, an upper supply input 326, and a lower supply input 328. The input terminal 322 is coupled to the input terminal 312 to receive the input signal. The first stage circuit 320 is configured to generate first stage output signals INX and INY based on the input signal received at the input terminal 322. In one configuration, for example, the first stage circuit 320 includes a buffer 323 for generating a non-inverted first stage output signal INY, and an inverter 321 for generating an inverted first stage output signal INX.

The buffer 323 has an input lead that is coupled to the input terminal 322, and a non-inverted output that is configured to output the non-inverted first stage output signal INY. The non-inverted output of the buffer 323 is coupled to the input terminal 332A of the boost circuit 330A via the output terminal 324. The non-inverted first stage output signal INY amplifies a non-inverted version of the input signal IN. The inverter 321 has an input lead that is coupled to the input terminal 322, and an inverted output that is coupled to the output of the inverted first stage output signal INX. The inverted output of the inverter 321 is coupled to the input terminal 332B of the boosted boost circuit 330B via the output terminal 324. The inverted first stage output signal INX inverts and amplifies the input signal IN. As such, the inverted first stage output signal INX is complementary of the first input signal INY.

The output terminal 324 is configured to deliver the first stage output signals INY and INY. The upper supply input 326 is coupled to the first supply terminal 316, whereas the lower supply input 328 is coupled to the second supply terminal 318. Together, the upper and lower supply inputs 326 and 328 are configured to receive an operating supply voltage that defines a rail-to-rail range of the first stage output signals INX and INY. For instance, the first stage output signals INX and INY may each have a voltage that is within the supply voltage range between VDD and 0V.

The boost circuit 330 may include one or more sub-circuits, such as an upper boost circuit 330A and a lower boost circuit 330B. The upper boost circuit 330A is configured to provide an upper boost voltage DVDD that is greater than the upper supply voltage VDD. The upper boost circuit 330A includes an input terminal 332A, a supply input 333A, and an output terminal 334A. The input terminal 332A is coupled to the output terminal 324 to receive the non-inverted first stage output signal INY. The upper boost circuit 330A includes a capacitor 335A that is coupled between the non-inverted output of the buffer 323 and the output terminal 334A. As such, the voltage at the output terminal 334A can be bootstrapped by the non-inverted first stage output signal INY.

The upper boost circuit 330A also includes a switch circuit 336A that is coupled between the first voltage supply terminal 316 and the output terminal 334A so as to selectively couple the output terminal 334A to the first voltage supply terminal 316 for pre-charging. The switch circuit 336A may include a PMOS transistor that is controlled by the output signal OUT. In particularly, the PMOS transistor 336A includes a gate coupled to the output terminal 314, a drain coupled to the first voltage supply terminal 316, and a source terminal coupled to the output terminal 334A. Alternatively, the switch circuit 336A may include a diode with an anode coupled to the first voltage supply terminal 316, and a cathode coupled to the output terminal 334A.

In operation, the upper boost circuit 330A provides an upper boost voltage DVDD that extends above the upper supply voltage VDD. More specifically, the capacitor 335A and the switch 336A are configured as a single-stage charge pump that has a supply input (e.g., 333A) coupled to the upper supply voltage VDD for establishing a base voltage (e.g., VDD), and a signal input (e.g., 332A) coupled to receive the non-inverted input signal (e.g., INY) for pumping up the base voltage. In this configuration, the charge pump 330A generates the upper boost voltage (e.g., DVDD) based on the non-inverted input signal. In one implementation, for example, the upper boost voltage DVDD can be higher than the upper supply voltage VDD by a magnitude of the non-inverted first stage output signal INY (e.g., VDD). In another implementation, for example, the upper boost voltage DVDD can be at two times the upper supply voltage VDD. The output terminal 334A is configured to output the upper boost voltage DVDD to power and enable the pull-up operations of the second stage circuit 340.

The lower boost circuit 330B provides a lower boost voltage DGND that is less than the lower supply voltage GND. The lower boost circuit 330B includes an input terminal 332B, an output terminal 334B, and a lower supply input 333B. The input terminal 332B is coupled to the output terminal 324 to receive the non-inverted first stage output signal INY. The lower boost circuit 330B includes a capacitor 335B that is coupled between the non-inverted output of the buffer 323 and the output terminal 334B. As such, the voltage at the output terminal 334B can be bootstrapped by the non-inverted first stage output signal INY.

The lower boost circuit 330B also includes a switch circuit 336B that is coupled between the second voltage supply terminal 318 and the output terminal 334B so as to selectively couple the output terminal 334B to the second voltage supply terminal 318 for pre-charging. The switch circuit 336B may include an NMOS transistor that is controlled by the output signal OUT. In particular, the NMOS transistor 336B includes a gate coupled to the output terminal 314, a drain coupled to the second voltage supply terminal 318, and a source terminal coupled to the output terminal 334B. Alternatively, the switch circuit 336B may include a diode with a cathode coupled to the second voltage supply terminal 318, and an anode coupled to the output terminal 334B.

In operation, the lower boost circuit 330B provides a lower boost voltage DGND that extends below the lower supply voltage GND. More specifically, the capacitor 335B and the switch 336B are configured as a single-stage charge pump that has a supply input (e.g., 333B) coupled to the lower supply voltage GND for establishing a base voltage (e.g., GND), and a signal input (e.g., 332B) coupled to receive the non-inverted input signal (e.g., INY) for pumping down the base voltage. In this configuration, the charge pump 330B generates the lower boost voltage (e.g., DGND) based on the non-inverted input signal. In one implementation, for example, the lower boost voltage DGND can be lower than the lower supply voltage GND by a magnitude of the non-inverted first stage output signal INY (e.g., VDD). The output terminal 334B is configured to output the lower boost voltage DGND to power and enable the pull-down operations of the second stage circuit 340. Together, the upper and lower boost circuits 330A and 330B define a boosted voltage range between the upper boost voltage DVDD and the lower boost voltage DGND. And advantageously, the boosted voltage range is greater than the operating voltage range.

The second stage circuit 340 serves as an output stage of the transmitter circuit 310, and the second stage circuit 340 is configured to generate the TX signal to be transmitted across an isolation capacitor (e.g., 250). The second stage circuit 340 includes an input terminal 342, an output terminal 344, an upper supply input 346, and a lower supply input 348. The input terminal 342 is coupled to the output terminal 324 to receive at least one of the first stage output signals INY or INX. The upper supply input 346 is coupled to the output terminal 334A to receive the upper boost voltage DVDD, whereas the lower supply input 348 is coupled to the output terminal 334B to receive the lower boost voltage DGND. The second stage circuit 340 is configured to generate a transmission (TX) signal that amplifies at least one of the first stage output signals INY or INX within the boosted voltage range as defined between the upper and lower boost voltages DVDD and DGND. The output terminal 344 is coupled to the output terminal 314, which is configured to transmit the TX signal.

In the configuration as shown in FIG. 3, for example, the second stage circuit 340 includes an inverter 341 with the input terminal 342 coupled to the output terminal 324 to receive the inverted first stage output signal INX. The inverter 341 includes a pull-up device (e.g., a PMOS transistor, a PNP transistor, or a resistor) that is coupled to the output terminal 334A via the upper supply input 346 for receiving the upper boost voltage DVDD. Likewise, the inverter 341 includes a pull-down device (e.g., a NMOS transistor, a NPN transistor, or a resistor) coupled to the output terminal 334B via the lower supply input 348 for receiving the lower boost voltage DGND.

In another configuration however, the second stage circuit 340 includes an inverter 341 with the input terminal 342 coupled to the output terminal 324 to receive the non-inverted first stage output signal INY. The inverter 341 includes a pull-up device (e.g., a PMOS transistor, a PNP transistor, or a resistor) that is coupled to the output terminal 334A via the upper supply input 346 for receiving the upper boost voltage DVDD. Likewise, the inverter 341 includes a pull-down device (e.g., a NMOS transistor, a NPN transistor, or a resistor) coupled to the output terminal 334B via the lower supply input 348 for receiving the lower boost voltage DGND.

The second stage circuit 340 is configured to generate a transmission (TX) signal OUT that amplifies at least one of the first stage output signals INX or INY within the boosted voltage range as defined between the upper and lower boost voltages DVDD and DGND. The TX signal OUT at the output terminal 314 may then be fed back to the P-type pass gate 336A of the charge pump 330A and the N-type pass gate 336B of the charge pump 330B.

When compared to the first stage circuit 320, the second stage circuit 340 operates under a boosted supply voltage range that is larger than the operating voltage range provided by the first and second supply terminals 316 and 318. As such, the TX signal generated by the second stage circuit 340 has a larger amplitude than the first stage output signals INX and INY. More specifically, the TX signal has a boost voltage that is within the boosted voltage range. In one implementation, for example, the TX signal has a boosted amplitude that is twice of the input signal as received by the input terminal 312. In another implementation, for example, the TX signal has a boosted amplitude that is three times of the input signal as received by the input terminal 312.

Figure 4:
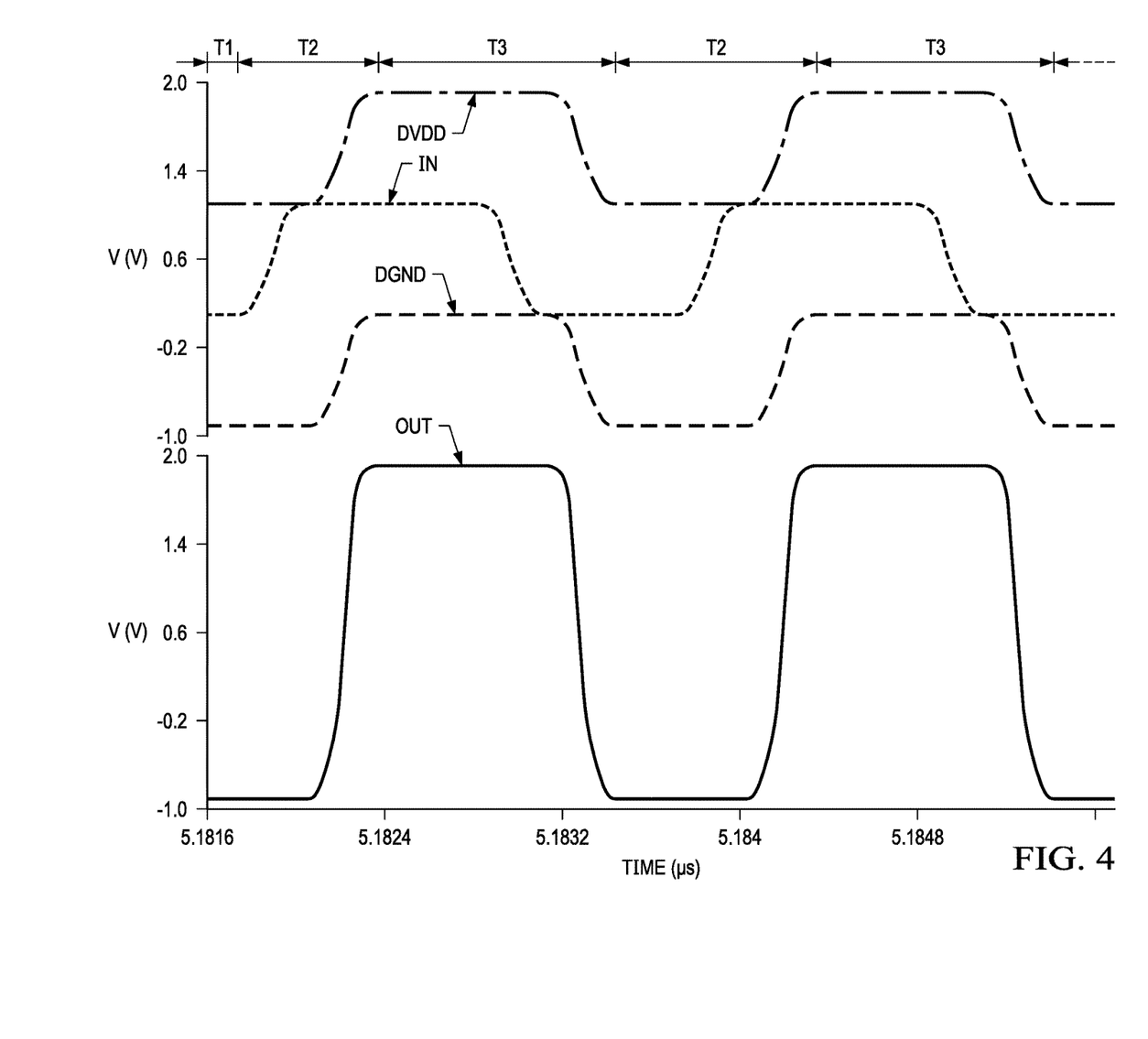
FIG. 4 shows timing diagrams of several signals in the transmitter circuit according to an aspect of the present disclosure.

Referring to FIG. 4, a transient view of several signals in the transmitter circuit 310 is shown to further elaborate on the internal operations of the transmitter circuit 310. During a first time period $T_1$, the input signal IN is at GND (e.g., 0V). The buffer 323 buffers the input signal IN and incurs a slight delay to generate the non-inverted first stage output signal INY at GND. Meanwhile, the inverter 321 inverts the input signal IN and incurs a slight delay to generate the inverted first stage output signal INX at VDD (e.g., 1V), thereby causing the output signal OUT (see, supra, also referred to as the TX signal) to turn on the PMOS transistor 336A. As a result, the output terminal 334A is pre-charged to VDD.

During a second time period $T_2$, the input signal IN changes from GND to VDD. The buffer 323 buffers the input signal IN and incurs a slight delay to generate the non-inverted first stage output signal INY at VDD. Because the input terminal 332A is bootstrapped to the output terminal 334A by the capacitor 335A, which has been pre-charged to VDD during the first time period T1, the upper boost voltage DVDD is boosted to 2*VDD (e.g., 2V). Meanwhile, the inverter 321 inverts the input signal IN and incurs a slight delay to generate the inverted first stage output signal INX at GND, thereby causing the output signal OUT (see, supra, also referred to as the TX signal) to turn on the NMOS transistor 336B. As a result, the output terminal 334B is pre-charged to GND. Moreover, because the second stage circuit 340 receives the upper boost voltage DVDD, the output signal OUT is pulled up to a transmission voltage that is twice VDD (e.g., 2V).

During a third time period $T_3$, the input signal IN changes from VDD to GND again. The buffer 323 buffers the input signal IN and incurs a slight delay to generate the non-inverted first stage output signal INY at GND. Because the input terminal 332B is bootstrapped to the output terminal 334B by the capacitor 335B, which has been pre-charged to GND during the second time period $T_2$, the lower boost voltage DGND is boosted to GND−VDD (e.g., −1V). Meanwhile, the inverter 321 inverts the input signal IN and incurs a slight delay to generate the inverted first stage output signal INX at VDD, thereby causing the output signal OUT (see, supra, also referred to as the TX signal) to turn on the PMOS transistor 336A again. As a result, the output terminal 334A is pre-charged to VDD again. Moreover, because the second stage circuit 340 receives the lower boost voltage DGND, the output signal OUT is pulled down to a transmission voltage that is below GND by VDD (e.g., −1V).

Transitioning from the second time period T2 to the third time period T3, the output signal OUT swings from 2*VDD to VDD (e.g., 2V to −1V), such that the rail-to-rail range is about 3*VDD (e.g., 3V), which is three times the signal amplitude of the input signal IN (e.g., 1V). Likewise, transitioning from the third time period T3 onward to the second time period T2, the output signal OUT swings from −VDD to 2*VDD (e.g., −1V to 2V), such that the rail-to-rail range is about 3*VDD (e.g., 3V), which is also three times the signal amplitude of the input signal IN (e.g., 1V).

Advantageously, the transmitter circuit 310, and the self-boosting scheme implemented thereby, can be used for boosting a transmission signal that operates at high frequency (e.g., greater than 500 MHz or less than 2 ns period) without requiring a higher supply voltage. The self-boosting scheme can be implemented without including large-size components that are typically used in rail voltage pump circuits. The transmitter circuit 310 can boost an input signal amplitude that is much higher than the device rating of an isolation device (e.g., 200) adopting the transmitter circuit 310. For example, where an isolation device has a 1.8V device rating, the transmitter circuit 310 can provide a TX signal with at least a 3.6V rail-to-rail swing. And where an isolation device has a 1V device rating, the transmitter circuit 310 can provide a TX signal with at least a 3V rail-to-rail swing.

The boost supply voltages DVDD and DGND provided by the boost circuits 330A and 330B can be dynamically adjusted based upon the particular signal state of the first stage output signals INX and INY. Under this dynamic boosting scheme, the potential difference between the upper boost voltage DVDD and the lower boost voltage DGND can be sustained at a smaller range than the full swing of the output signal OUT over the course of a transmission operation. As shown in FIG. 4, for instance, the potential difference between the upper boost voltage DVDD and the lower boost voltage DGND is around 2V, whereas the full swing of the output signal OUT is about 3V. Advantageously, this smaller dynamic boost range provides operational efficiency, which allows the transmitter circuit 310 to switch at high frequency with relatively low power consumption.

With the dynamic rail boosting, the TX signal has a higher noise margin and better CMTI performance (e.g., greater than 150 V/ns) than any conventional transmitter circuit for use in an isolation device. Moreover, the transmitter circuit 310 is versatile enough to fit within different types of isolation devices and operate under a wide range of supply voltage conditions and modulation frequencies. For example, the transmitter circuit 310 can be adopted by an opto-emulator isolation driver or a digital input isolation driver.

Referring to FIG. 5, the present disclosure introduces a transmitter circuit 510 which provides a differential-pair implementation of the transmitter circuit 210. Like the transmitter circuit 210, the transmitter circuit 510 can be adopted by an isolation device, such as the CID 200. The transmitter circuit 510 may be implemented on a single integrated circuit die, alone or with other circuit components of an isolation device, such as the CID 200. The transmitter circuit 510 includes an input terminal 512 that is configured to receive an input signal, and an output terminal 514 that is configured to transmit a transmission (TX) signal. The input signal can be a modulated signal with on-off keying, and the TX signal is an amplified version of the input signal. The transmitter circuit 510 includes a first voltage supply terminal 516 and a second voltage supply terminal 518 to provide an operating supply voltage for the transmitter circuit 510. In one implementation, the first voltage supply terminal 516 may be configured to receive a regulated voltage of VDD, which is greater than a ground voltage, and the second voltage supply terminal 518 may be configured to receive a ground voltage, which may be 0V. The value of VDD may vary depending on the relevant applications of the transmitter device 510. In one example, VDD may have a value of 1.8V where the transmitter device 510 is deployed in a digital-input isolator. In another example VDD may have a value of 1V where transmitter device 510 is deployed in an opto-emulator.

Like the transmitter circuit 210, the transmitter circuit 510 also includes a first stage circuit 520, a boost circuit 530 (which may be subdivided into 530A and 530B), and a second stage circuit 540. The first stage circuit 520 includes an input terminal 522, an output terminal 524, an upper supply input 526, and a lower supply input 528. The input terminal 522 is coupled to the input terminal 512 to receive the input signal. The first stage circuit 520 is configured to generate first stage output signals 513 based on the input signal received at the input terminal 522. In one configuration, for example, the first stage circuit 520 includes a buffer 523 and an inverter 521.

The buffer 523 has an input lead that is coupled to the input terminal 522, and a non-inverted output that is configured to output a first stage output signal INY. The non-inverted output of the buffer 523 is coupled to the input terminal 532A of the boost circuit 530A via the output terminal 524. The first stage output signal INY amplifies a non-inverted version of the input signal IN. The inverter 521 has an input lead that is coupled to the input terminal 522, and an inverted output that is coupled to output a first stage output signal INX. The inverted output of the inverter 521 is coupled to the input terminal 532B of the boost circuit 530B via the output terminal 524. The first stage output signal INX inverts and amplifies the input signal IN, such that the first stage output signal INX is complementary of the first input signal INY.

The output terminal 524 is configured to deliver the first stage output signals INY and INY. The upper supply input 526 is coupled to the first supply terminal 516, whereas the lower supply input 528 is coupled to the second supply terminal 518. Together, the upper and lower supply inputs 526 and 528 are configured to receive an operating supply voltage that defines a rail-to-rail range of the first stage output signals INX and INY. For instance, the first stage output signals INX and INY may each have a voltage that is within the supply voltage range between VDD and 0V.

The boost circuit 530 may include one or more sub-circuits, such as an upper boost circuit 530A and a lower boost circuit 530B. The upper boost circuit 530A provides upper boost voltages DVDDX and DVDDY that are each greater than the upper supply voltage VDD. The upper boost circuit 530A includes an input terminal 532A, an output terminal 534A, and an upper supply input 533A. The input terminal 532A is coupled to the output terminal 524 to receive the non-inverted first stage output signal INY, as well as the inverted first stage output signal INX. The upper boost circuit 530A includes a first capacitor 535A and a second capacitor 537A. The first capacitor 535A is coupled between the non-inverted output of the buffer 523 and the non-inverted partition (e.g., DVDDY) of the output terminal 534A. Through the first capacitor 535A, the first upper boost voltage DVDDY at the output terminal 534A is bootstrapped to the non-inverted first stage output signal INY. Meanwhile, the second capacitor 537A is coupled between the inverted output of the inverter 521 and the inverted partition (e.g., DVDDX) of the output terminal 534A. Through the second capacitor 537A, the second upper boost voltage DVDDX at the output terminal 534A is bootstrapped to the inverted first stage output signal INX.

The upper boost circuit 530A also includes a first switch circuit 536A and a second switch circuit 538A. The first switch circuit 536A is coupled between the first voltage supply terminal 516 and the non-inverted partition (e.g., DVDDY) of the output terminal 534A. As such, the first switch circuit 536A is configured to selectively couple the non-inverted partition (e.g., DVDDY) of the output terminal 534A to the first voltage supply terminal 516 for pre-charging. Meanwhile, the second switch circuit 538A is coupled between the first voltage supply terminal 516 and the inverted partition (e.g., DVDDX) of the output terminal 534A. As such, the second switch circuit 538A is configured to selectively couple the inverted partition (e.g., DVDDX) of the output terminal 534A to the first voltage supply terminal 516 for pre-charging.

The first and second switch circuits 536A and 538A may include a pair of cross-coupled transistors, such as a first NMOS transistor N1 and a second NMOS transistor N2. In this cross-coupled configuration, the first NMOS transistor N1 is controlled by the second upper boost voltage DVDDX, whereas the second NMOS transistor N2 is controlled by the first upper boost voltage DVDDY. In particular, the first NMOS transistor N1 includes a gate coupled to the inverted partition (e.g., DVDDX) of the output terminal 534A, a source coupled to the first voltage supply terminal 516, and a drain coupled to the non-inverted partition (e.g., DVDDY) of the output terminal 534A. Likewise, the second NMOS transistor N2 includes a gate coupled to the non-inverted partition (e.g., DVDDY) of the output terminal 534A, a source coupled to the first voltage supply terminal 516, and a drain coupled to the inverted partition (e.g., DVDDX) of the output terminal 534A. In an alternative implementation, the switch circuits 536A and 538A may each include a diode with an anode coupled to the first voltage supply terminal 516, and a cathode coupled to the respective partition of output terminal 534A.

In operation, the upper boost circuit 530A provides upper boost voltages DVDDX and DVDDY that each extends above the upper supply voltage VDD. More specifically, the capacitor 535A and the switch 536A are configured as a first single-stage charge pump for providing the first upper boost voltage DVDDY, whereas the capacitor 537A and the switch 538A are configured as a second single-stage charge pump for providing the second upper boost voltage DVDDX.

The first charge pump (e.g., 535A and 536A) has a supply input (e.g., 533A) coupled to the upper supply voltage VDD for establishing a base voltage (e.g., VDD), and a signal input (e.g., 532A) coupled to receive the non-inverted input signal (e.g., INY) for pumping up the base voltage. In this configuration, the first charge pump (e.g., 535A and 536A) is configured to generate the first upper boost voltage DVDDY based on the non-inverted input signal. In one implementation, for example, the first upper boost voltage DVDDY can be higher than the upper supply voltage VDD by a magnitude of the non-inverted first stage output signal INY. In another implementation, for example, the first upper boost voltage DVDDY can be at least two times the upper supply voltage VDD. The output terminal 534A is configured to output the first upper boost voltage DVDDY to power and enable the pull-up operations for generating a non-inverted output OUTP by the second stage circuit 540.

Similarly, the second charge pump (e.g., 537A and 538A) has a supply input (e.g., 533A) coupled to the upper supply voltage VDD for establishing a base voltage (e.g., VDD), and a signal input (e.g., 532A) coupled to receive the inverted input signal (e.g., INX) for pumping up the base voltage. In this configuration, the second charge pump (e.g., 537A and 538A) is configured to generate the second upper boost voltage DVDDX based on the inverted input signal. In one implementation, for example, the second upper boost voltage DVDDX can be higher than the upper supply voltage VDD by a magnitude of the non-inverted first stage output signal INX. In another implementation, for example, the second upper boost voltage DVDDX can be at least two times the upper supply voltage VDD. The output terminal 534A is configured to output the second upper boost voltage DVDDX to power and enable the pull-up operations for generating an inverted output OUTN by the second stage circuit 540.

The lower boost circuit 530B provides lower boost voltages DGNDX and DGNDY that are each less than the lower supply voltage GND. The lower boost circuit 530B includes an input terminal 532B, an output terminal 534B, and a lower supply input 533B. The input terminal 532B is coupled to the output terminal 524 to receive the non-inverted first stage output signal INY, as well as the inverted first stage output signal INX. The lower boost circuit 530B includes a first capacitor 535B and a second capacitor 537B. The first capacitor 535B is coupled between the non-inverted output of the buffer 523 and the non-inverted partition (e.g., DGNDY) of the output terminal 534B. Though the first capacitor 535B, the first lower boost voltage DGNDY at the output terminal 534B is bootstrapped to the non-inverted first stage output signal INY. Meanwhile, the second capacitor 537B is coupled between the inverted output of the inverter 521 and the inverted partition (e.g., DGNDX) of the output terminal 534B. Though the second capacitor 537B, the second lower boost voltage DGNDX at the output terminal 534B is bootstrapped to the inverted first stage output signal INX.

The lower boost circuit 530B also includes a first switch circuit 536B and a second switch circuit 538B. The first switch circuit 536B is coupled between the second voltage supply terminal 518 and the non-inverted partition (e.g., DGNDY) of the output terminal 534B. As such, the first switch circuit 536B is configured to selectively couple the non-inverted partition (e.g., DGNDY) of the output terminal 534B to the second voltage supply terminal 518 for pre-charging. Meanwhile, the second switch circuit 538B is coupled between the second voltage supply terminal 518 and the inverted partition (e.g., DGNDX) of the output terminal 534B. As such, the second switch circuit 538B is configured to selectively couple the inverted partition (e.g., DGNDX) of the output terminal 534B to the second voltage supply terminal 518 for pre-charging.

The first and second switch circuits 536B and 538B may include a pair of cross-coupled transistors, such as a first PMOS transistor P1 and a second PMOS transistor P2. In this cross-coupled configuration, the first PMOS transistor P1 is controlled by the second lower boost voltage DGNDX, whereas the second PMOS transistor P2 is controlled by the first lower boost voltage DGNDY. In particular, the first PMOS transistor P1 includes a gate coupled to the inverted partition (e.g., DGNDX) of the output terminal 534B, a source coupled to the second voltage supply terminal 518, and a drain coupled to the non-inverted partition (e.g., DGNDY) of the output terminal 534B. Likewise, the second PMOS transistor P2 includes a gate coupled to the non-inverted partition (e.g., DGNDY) of the output terminal 534B, a source coupled to the second voltage supply terminal 518, and a drain coupled to the inverted partition (e.g., DGNDX) of the output terminal 534B. In an alternative implementation, the switch circuits 536B and 538B may each include a diode with an anode coupled to the second voltage supply terminal 518, and a cathode coupled to the respective partition of output terminal 534B.

In operation, the lower boost circuit 530B provides lower boost voltages DGNDX and DGNDY that each extends below the lower supply voltage GND. More specifically, the capacitor 535B and the switch 536B are configured as a first single-stage charge pump for providing the first lower boost voltage DGNDY, whereas the capacitor 537B and the switch 538B are configured as a second single-stage charge pump for providing the second lower boost voltage DGNDX.

The first charge pump (e.g., 535B and 536B) has a supply input (e.g., 533B) coupled to the lower supply voltage GND for establishing a base voltage (e.g., GND), and a signal input (e.g., 532V) coupled to receive the non-inverted input signal (e.g., INY) for pumping down the base voltage. In this configuration, the first charge pump (e.g., 535B and 536B) is configured to generate the first lower boost voltage DGNDY based on the non-inverted input signal. In one implementation, for example, the first lower boosted voltage DGNDY can be lower than the lower supply voltage GND by a magnitude of the non-inverted first stage output signal INY. The output terminal 534B is configured to output the first lower boosted voltage DGNDY to power and enable the pull-down operations for generating the non-inverted output signal OUTP by the second stage circuit 540.

Similarly, the second charge pump (e.g., 537B and 538B) has a supply input (e.g., 533B) coupled to the lower supply voltage GND for establishing a base voltage (e.g., GND), and a signal input (e.g., 532B) coupled to receive the inverted input signal (e.g., INX) for pumping down the base voltage. In this configuration, the second charge pump (e.g., 537B and 538B) is configured to generate the second lower boost voltage DGNDX based on the inverted input signal. In one implementation, for example, the second lower boost voltage DGNDX can be lower than the lower supply voltage GND by a magnitude of the non-inverted first stage output signal INX. The output terminal 534B is configured to output the second lower boosted voltage DGNDX to power and enable the pull-down operations for generating the inverted output signal OUTN by the second stage circuit 540.

Together, the upper and lower boost circuits 530A and 530B define a first boosted voltage range for generating a non-inverted output signal OUTP (or non-inverted transmission TXP signal), and a second boosted voltage range for generating an inverted output signal OUTN (or non-inverted transmission TXN signal). The first boosted voltage range is between DVDDY and DGNDY, and the second boosted voltage range is between DVDDX and DGNDX.

Like the second stage circuits 240 and 340, the second stage circuit 540 serves as an output stage of the transmitter circuit 510. The second stage circuit 540 is configured to generate a differential pair of TX signals (OUTP and OUTN) for transmission across the isolation capacitor (e.g., 250). The second stage circuit 540 includes an input terminal 542, an output terminal 544, an upper supply input 546, and a lower supply input 548. The input terminal 542 is coupled to the output terminal 524 to receive the first stage output signals INY and INX. The upper supply input 546 is coupled to the output terminal 534A to receive the upper boost voltages DVDDY and DVDDY, whereas the lower supply input 548 is coupled to the output terminal 534B to receive the lower boosted voltages DGNDY and DGNDX. The second stage circuit 540 is configured to generate a differential pair of transmission (TX) signals OUTP and OUTN that amplifies the first stage output signals INY or INX within the boosted voltage range as defined between the upper and lower boost voltages. The output terminal 544 is coupled to the output terminal 514, which is configured to transmit the differential pair of transmission (TX) signals OUTP and OUTN.

In the configuration as shown in FIG. 5, for example, the second stage circuit 540 includes a first inverter 541 and a second inverter 542. The first inverter 541 is coupled to the output terminal 524 via the input terminal 542 to receive the inverted first stage output signal INX. The first inverter 541 includes a pull-up device (e.g., a PMOS transistor, a PNP transistor, or a resistor) that is coupled to the output terminal 534A via the upper supply input 546 for receiving the first upper boost voltage DVDDY. Likewise, the first inverter 541 includes a pull-down device (e.g., a NMOS transistor, a NPN transistor, or a resistor) coupled to the output terminal 534B via the lower supply input 548 for receiving the first lower boost voltage DGNDY. The first inverter 541 is configured as an amplifier to generate a non-inverted transmission (TX) signal OUTP that amplifies and inverts the inverted first stage output signal INX within the first boosted voltage range, which is defined between the upper and lower boost voltages DVDDY and DGNDY. By inverting the inverted first stage output signal INX, the first inverter 541 also functions as a non-inverted output stage circuit in relative to the input signal IN.

The second inverter 543 is coupled to the output terminal 524 via the input terminal 542 to receive the non-inverted first stage output signal INY. The second inverter 543 includes a pull-up device (e.g., a PMOS transistor, a PNP transistor, or a resistor) that is coupled to the output terminal 534A via the upper supply input 546 for receiving the second upper boost voltage DVDDX. Likewise, the second inverter 543 includes a pull-down device (e.g., a NMOS transistor, a NPN transistor, or a resistor) coupled to the output terminal 534B via the lower supply input 548 for receiving the second lower boost voltage DGNDX. The second inverter 543 is configured as an amplifier to generate an inverted transmission (TX) signal OUTN that amplifies and inverts the non-inverted first stage output signals INY within the second boosted voltage range, which is defined between the upper and lower boost voltages DVDDX and DGNDX. By inverting the non-inverted first stage output signal INY, the second inverter 542 also functions as an inverted output stage circuit in relative to the input signal IN.

When compared to the first stage circuit 520, the second stage circuit 540 operates at a boosted supply voltage range that is higher than the operating voltage range provided by the first and second supply terminals 516 and 518. As such, the TX signals OUTP and OUTN each has a larger amplitude than the first stage output signals INX and INY respectively. More specifically, the TX signals OUTP and OUTN each has a boosted voltage that is within the boosted voltage range. In one implementation, for example, the TX signals OUTP and OUTN each has a boosted amplitude that is twice of the input signal as received by the input terminal 512. In another implementation, for example, the TX signals OUTP and OUTN each has a boosted amplitude that is three time of the input signal as received by the input terminal 512. Moreover, when compared to the transmitter circuit 310, the transmitter circuit 510 provides better delay matching and a more compact design by means of the aforementioned differential configuration.

Figure 6:
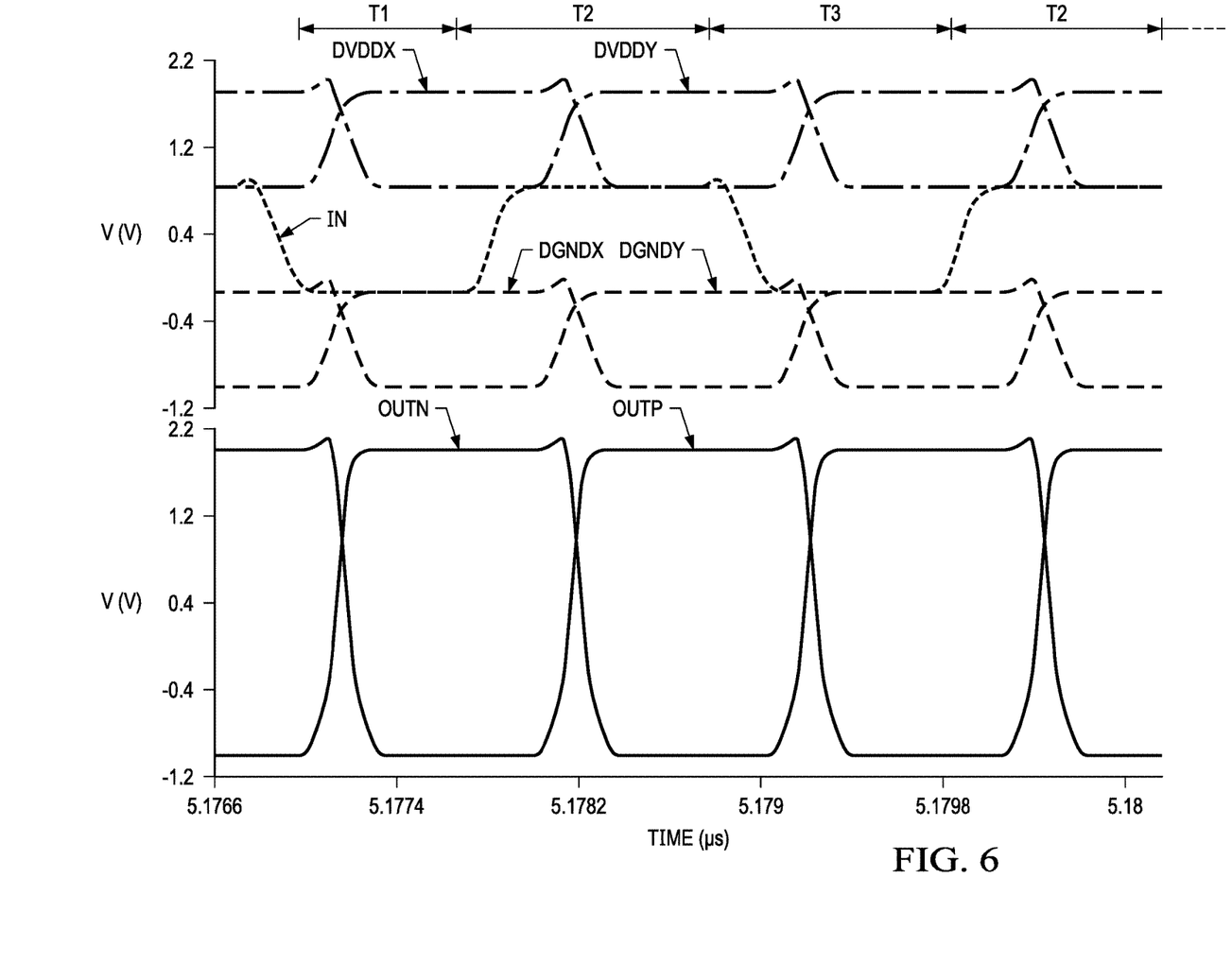
FIG. 6 shows timing diagrams of several signals in the bipolar transmitter circuit according to an aspect of the present disclosure.

Referring to FIG. 6, a transient view of several signals in the transmitter circuit 510 is shown to further elaborate the internal operations of the transmitter circuit 510. During a first time period $T_1$, the input signal IN is at GND (e.g., 0V). The buffer 523 buffers the input signal IN and incurs a slight delay to generate the non-inverted first stage output signal INY at GND, thereby turning on the PMOS transistor P1. As a result, the inverted partition (e.g., DGNDX) of the output terminal 534B is pre-charged to GND.

Meanwhile, the inverter 521 inverts the input signal IN and incurs a slight delay to generate the inverted first stage output signal INX at VDD (e.g., 1V), thereby turning on the NMOS transistor N1. As a result, the non-inverted partition (e.g., DVDDY) of the output terminal 534A is pre-charged to VDD.

During a second time period $T_2$, the input signal IN changes from GND to VDD. The buffer 523 buffers the input signal IN and incurs a slight delay to generate the non-inverted first stage output signal INY at VDD. Because the output of the buffer 523 is bootstrapped to the non-inverted partition (e.g., DVDDY) of the output terminal 534A by the capacitor 535A, which has been pre-charged to VDD during the first time period T1, the upper boost voltage DVDDY is boosted to 2*VDD (e.g., 2V). The upper boost voltage DVDDY also turns on the NMOS transistor N2, thereby causing the inverted partition (e.g., DVDDX) of the output terminal 534A to be pre-charged to VDD.

Meanwhile, the inverter 521 inverts the input signal IN and incurs a slight delay to generate the inverted first stage output signal INX at GND, thereby turning on the PMOS transistor P1. As a result, the non-inverted partition (e.g., VGNDY) of the output terminal 534B is pre-charged to GND. Moreover, because the second stage circuit 540 receives the upper boost voltage DVDDY, the non-inverted output signal OUTP is pulled up to a transmission voltage that is twice of VDD. At the same time, the inverted first stage output signal INX is bootstrapped to the inverted partition of the output terminal 534B, thereby pumping down the lower boost voltage DGNDX to be GND−VDD. Accordingly, the inverted output signal OUTN is pulled down to a transmission voltage that is less than GND by VDD.

During a third time period $T_3$, the input signal IN changes from VDD to GND again. The buffer 523 buffers the input signal IN and incurs a slight delay to generate the non-inverted first stage output signal INY at GND. Because the output of the buffer 523 is bootstrapped to the non-inverted partition of the output terminal 534B by the capacitor 535B, which has been pre-charged to GND during the second time period $T_2$, the lower boost voltage DGNDY is boosted to GND−VDD (e.g., −1V). The lower boost voltage DGNDY also turns on the PMOS transistor P2, thereby causing the inverted partition (e.g., DVDDX) of the output terminal 534B to be pre-charged to GND.

Meanwhile, the inverter 521 inverts the input signal IN and incurs a slight delay to generate the inverted first stage output signal INX at VDD, thereby turning on the NMOS transistor N1 again. As a result, the non-inverted partition (e.g., DVDDY) of the output terminal 534A is pre-charged to VDD again. Moreover, because the second stage circuit 540 receives the lower boost voltage DGNDY, the non-inverted output signal OUTP is pulled down to a transmission voltage that is below GND by VDD. At the same time, the inverted first stage output signal INX is bootstrapped to the inverted partition of the output terminal 534A, thereby pumping up the upper boost voltage DVDDX to be 2*VDD. Accordingly, the inverted output signal OUTN is pulled up to a transmission voltage that is twice of VDD.

Advantageously, the transmitter circuit 510, and the self-boosting scheme implemented thereby, can be used for boosting a transmission signal that operates under high frequency (e.g., greater than 500 MHz or less than 2 ns period) without requiring a higher supply voltage. The self-boosting scheme can be implemented without including large-size components that are typically used in rail voltage pump circuit. The transmitter circuit 510 can boost an input signal amplitude that is much higher than the device rating of an isolation device (e.g., 200) adopting the transmitter circuit 510. For example, where the CID 200 has a 1.8V device rating, the transmitter circuit 510 can provide a different pair of TX signals OUTP and OUTN each having at least a 3.6V rail-to-rail swing. And where the CID 200 has a 1V device rating, the transmitter circuit 510 can provide a different pair of TX signals OUTP and OUTN each having at least a 3V rail-to-rail swing.

The boost supply voltages DVDDX, DVDDY, DGNDX, and DGNDY provided by the boost circuits 530A and 530B can be dynamic in operation, which are adjustable based upon the particular signal state of the first stage output signals INX and INY. Under this dynamic boosting scheme, the potential difference between the upper boost voltage DVDDX/DVDDY and the lower boost voltage DGNDX/DGNDY can be sustained at a smaller range than the full swing of the output signal OUTN/OUTP over the course of a transmission operation. As shown in FIG. 6, for instance, the potential difference between the upper boost voltage DVDDX/DVDDY and the lower boost voltage DGNDX/DGNDY is around 2V, whereas the full swing of the output signal OUTN/OUTP is about 3V. Advantageously this smaller dynamic boost range provides operational efficiency, which allows the transmitter circuit 510 to switch in high frequency without with relatively low power consumption.

With the dynamic rail boosting, the TX signals OUTP and OUTN each has a higher noise margin and better CMTI performance (e.g., greater than 150 V/ns) than any conventional transmitter circuits. Moreover, the transmitter circuit 510 is versatile enough to fit within different types of isolation devices and operate under a wide range of supply voltage conditions and modulation frequencies. For example, the transmitter circuit 510 can be adopted by an opto-emulator isolation driver or a digital input isolation driver.

Consistent with the present disclosure, the term "configured to" purports to describe the structural and functional characteristics of one or more tangible non-transitory components. For example, the term "configured to" can be understood as having a particular configuration that is designed or dedicated for performing a certain function. Within this understanding, a device is "configured to" perform a certain function if such a device includes tangible non-transitory components that can be enabled, activated, or powered to perform that certain function. While the term "configured to" may encompass the notion of being configurable, this term should not be limited to such a narrow definition. Thus, when used for describing a device, the term "configured to" does not require the described device to be configurable at any given point of time.

Furthermore, terms of relativity, such as "about," "approximately," "substantially," "near," "within a proximity," "sufficient . . . to," "maximum," and "minimum," as applied to features of an integrated circuit and/or a semiconductor device can be understood with respect to the fabrication tolerances of a particular process for fabricating the integrated circuit and/or the semiconductor device. In addition, these terms of relativity can be understood within a framework for performing one or more functions by the integrated circuit and/or the semiconductor device.

More specifically, for example, the terms "substantially the same," "substantially equals," and "approximately the same" purport to describe a quantitative relationship between two objects. This quantitative relationship may prefer the two objects to be equal by design but with the anticipation that a certain amount of variations can be introduced by the fabrication process. In one aspect, a first resistor may have a first resistance that is substantially equal to a second resistance of the second resistor where the first and second resistors are purported to have the same resistance yet the fabrication process introduces slight variations between the first resistance and the second resistance. Thus, the first resistance can be substantially equal to the second resistance even when the fabricated first and second resistors demonstrate slight difference in resistance. This slight difference may be within 5% of the design target. In another aspect, a first resistor may have a first resistance that is substantially equal to a second resistance of a second resistor where the process variations are known a priori, such that the first resistance and the second resistance can be preset at slightly different values to account for the known process variations. Thus, the first resistance can be substantially equal to the second resistance even when the design values of the first and second resistance are preset to include a slight difference to account for the known process variations. This slight difference may be within 5% of the design target.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results unless such order is recited in one or more claims. In certain circumstances, multitasking and parallel processing may be advantageous. Moreover, the separation of various system components in the embodiments described above should not be understood as requiring such separation in all embodiments.

The invention claimed is:

1. A capacitive isolation device (CID) comprising:
a transmitter circuit including:
   a voltage supply terminal;
   a first stage circuit having a first supply input coupled to the voltage supply terminal, a first input terminal, a first output terminal, a buffer having a first input lead coupled to the first input terminal and a non-inverted output, and an inverter having a second input lead coupled to the first input terminal and an inverted output;
   a boost circuit having a second supply input coupled to the voltage supply terminal, a second input terminal coupled to the non-inverted output of the buffer via the first output terminal, a second output terminal, a first capacitor coupled between the non-inverted output of the buffer and a non-inverted partition of the second output terminal, a second capacitor coupled between the inverted output of the inverter and an inverted partition of the second output terminal, and a switch circuit coupled between the voltage supply terminal and the second output terminal having a pair of cross-coupled transistors including source terminals coupled to the voltage supply terminal and drain terminals respectively coupled to the non-inverted and inverted partitions of the second output terminal; and
   a second stage circuit having a third supply input coupled to the second output terminal, a third input terminal coupled to the inverted output of the buffer via the first output terminal, a third output terminal, a second inverter coupled to the non-inverted partition of the second output terminal via the third supply input and coupled to receive the inverted output from the first stage circuit, and a third inverter coupled to the inverted partition of the second output terminal via the third supply input and coupled to receive the non-inverted output from the first stage circuit;
a receiver circuit having a receiver input terminal and a receiver output terminal; and
an isolation capacitor coupled between the third output terminal of the second stage circuit and the receiver input terminal of the receiver circuit.

2. The CID of claim 1, wherein:
the voltage supply terminal is configured to revive a supply voltage greater than a ground voltage;
the switch circuit includes a PMOS transistor having a gate coupled to the third output terminal, a drain coupled to the voltage supply terminal, and a source terminal coupled to the second output terminal; and
the second stage circuit include a pull-up device coupled to the second output terminal via the third supply input.

3. The CID of claim 1, wherein:
the voltage supply terminal is configured to revive a ground voltage; and the switch circuit includes an NMOS transistor having a gate coupled to the third output terminal, a drain coupled to the voltage supply terminal, and a source terminal coupled to the second output terminal; and the second stage circuit include a pull-down device coupled to the second output terminal via the third supply input.

4. The CID of claim 1, wherein:

the voltage supply terminal is configured to receive a supply voltage greater than a ground voltage;

the pair of cross-coupled transistors includes:
 a first NMOS transistor having a first gate coupled to the inverted partition of the second output terminal; and
 a second NMOS transistor having a second gate coupled to the non-inverted partition of the second output terminal;

the second inverter includes a first pull-up device coupled to the non-inverted partition of the second output terminal; and the third inverter includes a second pull-up device coupled to the inverted partition of the second output terminal.

5. The CID of claim 1, wherein:

the voltage supply terminal is configured to receive a ground voltage;

the pair of cross-coupled transistors includes:
 a first PMOS transistor having a first gate coupled to the inverted partition of the second output terminal; and
 a second PMOS transistor having a second gate coupled to the non-inverted partition of the second output terminal;

the second inverter includes a first lower supply input coupled to the non-inverted partition of the second output terminal; and the third inverter includes a second lower supply input coupled to the inverted partition of the second output terminal.

6. The CID of claim 1, wherein the voltage supply terminal is configured to receive a supply voltage greater than a ground voltage, and the third output terminal is configured to deliver an output voltage at least two times greater than a difference between the supply voltage and the ground voltage.

7. A capacitive isolation device (CID) comprising:

a transmitter circuit including:
 a first stage circuit configured to: receive an input signal, generate a first signal based on the input signal, and generate a second signal complementary of the first signal, the first and second signals each having a first voltage within a supply voltage range;
 a boost circuit coupled to the first stage circuit, and configured to provide a boosted voltage range greater than the supply voltage range responsive to at least one of the first or second signal; and
 a second stage circuit configured to generate an output signal based on either one of the first or second signal, the output signal having a second voltage within the boosted voltage range;

a receiver circuit having a receiver input terminal and a receiver output terminal; and an isolation capacitor coupled between the receiver input terminal of the receiver circuit and an output terminal of the second stage circuit.

8. The CID of claim 7, wherein the boosted voltage range is at least two times the supply voltage range.

9. The CID of claim 7, wherein:

the transmitter circuit includes first and second voltage supply lines defining the supply voltage range;

the boost circuit includes:
 a first charge pump configured to generate an upper boost voltage from the first voltage supply line and based on the first signal generated by the first stage circuit; and
 a second charge pump configured to generate a lower boost voltage from the second voltage supply line and based on the first signal generated by the first stage circuit; and the boosted voltage range is defined between the upper boost voltage and the lower boost voltage.

10. The CID of claim 9, wherein the output signal is fed back to a P-type pass gate of the first charge pump and an N-type pass gate of the second charge pump.

11. The CID of claim 9, wherein the boost circuit includes:
 a third charge pump configured to generate the upper boost voltage from the first voltage supply line and based on the second signal generated by the first stage circuit; and
 a fourth charge pump configured to generate the lower boost voltage from the second voltage supply line and based on the second signal generated by the first stage circuit.

12. The CID of claim 11, wherein the second stage circuit includes:
 a first amplifier coupled to the first and second charge pumps, and configured to generate the output signal inverting and amplifying the second signal within the boosted voltage range; and
 a second amplifier coupled to the third and fourth charge pumps, and configured to generate an inverted output signal inverting and amplifying the first signal within the boosted voltage range.

13. A capacitive isolation device (CID) comprising:

a receiver circuit;

a capacitor having a first end, and a second end coupled to the receiver circuit;

a transmitter circuit coupled to the first end of the capacitor, the transmitter circuit including:
 first and second voltage supply lines;
 a first charge pump having a first supply input coupled to the first voltage supply line, a first signal input coupled to receive a non-inverted input signal, and a first output;
 a second charge pump having a second supply input coupled to the second voltage supply line, a second signal input coupled to receive the non-inverted input signal, and a second output; and
 a non-inverting output stage circuit having an upper supply input coupled to the first output of the first charge pump, and a lower supply input coupled to the second output of the second charge pump.

14. The CID of claim 13, wherein the transmitter circuit further includes:
 a third charge pump having a third supply input coupled to the first voltage supply line, a third signal input coupled to receive the inverted input signal, and a third output;
 a fourth charge pump having a fourth supply input coupled to the second voltage supply line, a fourth signal input coupled to receive the inverted input signal, and a fourth output; and an inverting output stage circuit having a second upper supply input coupled to the third output of the third charge pump, and a second lower supply input coupled to the fourth output of the fourth charge pump.

15. The CID of claim 13, wherein the transmitter circuit includes:
 a buffer coupled between the first and second voltage supply lines, and configured to generate the non-inverted input signal based on an input signal; and
 an inverter coupled between the first and second voltage supply lines, and configured to generate the inverted input signal based on the input signal.

\* \* \* \* \*